United States Patent
Takahashi et al.

(10) Patent No.: US 8,026,486 B2
(45) Date of Patent: Sep. 27, 2011

(54) RADIATION DETECTOR AND RADIATION DETECTION METHOD

(75) Inventors: Kohei Takahashi, Osaka (JP); Tsutomu Kanno, Kyoto (JP); Akihiro Sakai, Osaka (JP); Hideaki Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/865,347

(22) PCT Filed: Nov. 17, 2009

(86) PCT No.: PCT/JP2009/006167
§ 371 (c)(1),
(2), (4) Date: Jul. 29, 2010

(87) PCT Pub. No.: WO2010/058559
PCT Pub. Date: May 27, 2010

(65) Prior Publication Data
US 2010/0327165 A1 Dec. 30, 2010

(30) Foreign Application Priority Data
Nov. 21, 2008 (JP) ................... 2008-297543

(51) Int. Cl.
G01J 5/02 (2006.01)
(52) U.S. Cl. .................................................. 250/338.2
(58) Field of Classification Search ............. 250/338.2
See application file for complete search history.

(56) References Cited

U.S. PATENT DOCUMENTS

| | | | |
|---|---|---|---|
| 5,793,092 A | | 8/1998 | Habermeier et al. |
| 5,823,682 A | * | 10/1998 | Betz .................. 374/130 |
| 7,067,205 B2 | * | 6/2006 | Adachi et al. .......... 428/701 |
| 7,312,392 B2 | | 12/2007 | Yotsuhashi et al. |
| 2003/0151064 A1 | | 8/2003 | Ohno et al. |
| 2006/0021646 A1 | * | 2/2006 | Yotsuhashi et al. ...... 136/236.1 |
| 2011/0024604 A1 | | 2/2011 | Takahashi et al. |

FOREIGN PATENT DOCUMENTS

| | | |
|---|---|---|
| JP | 8-247851 | 9/1996 |
| JP | 2003-273469 | 9/2003 |
| JP | 2008-28048 | 2/2008 |

(Continued)

OTHER PUBLICATIONS

Kanno, et al., "Anisotropic thermoelectric properties in layered cobaltite $A_xCoO_2$ (A=Sr and Ca) thin films", Applied Physics Letters, vol. 85, No. 5, pp. 739-741, Aug. 2, 2004.

(Continued)

Primary Examiner — Constantine Hannaher
(74) Attorney, Agent, or Firm — Hamre, Schumann, Mueller & Larson, P.C.

(57) ABSTRACT

A radiation detector with high detection sensitivity. The radiation detector according to the present invention includes an $Al_2O_3$ substrate, a $Fe_2O_3$ thin film layered on the $Al_2O_3$ substrate, a $Ca_xCoO_2$ (where $0.15<x<0.55$) thin film that is layered on the $Fe_2O_3$ thin film and that has $CoO_2$ planes that are aligned inclined to the surface of the $Al_2O_3$ substrate, a first electrode disposed on the $Ca_xCoO2$ thin film, and a second electrode disposed on the $Ca_xCoO_2$ thin film in a position opposed to the first electrode in the direction in which the $CoO_2$ planes are aligned inclined.

6 Claims, 13 Drawing Sheets

FOREIGN PATENT DOCUMENTS

WO          2005/083808          9/2005

OTHER PUBLICATIONS

Sakai, et al., "Preparation and Anisotropic Thermoelectric Properties in Misfit Cobaltite Thin Films", 2005 International Conference on Thermoelectrics, pp. 276-279, Jun. 19, 2005.

Kwok, et al., "Anomalous photovoltaic response in $YBa_2Cu_3O_7$", Physical Review B, vol. 46, No. 6, pp. 3692-3695, Aug. 1, 1992.

Bdikin, et al., "Growth and domain structure of $YBa_2Cu_3O_x$ thin films and $YBa_2Cu_3O_x/CeO_2$ heterostructures on tilted $NdGaO_3$ substrates" Physica C, vol. 377, pp. 26-35, 2002.

Lankes, et al., "Large Transverse Seebeck Voltage in Oxygen-reduced $YBa_2Cu_3O_7$ and $Y_{1-x}Pr_xBa_2Cu_3O_{7-\alpha}$ Thin Films"$15^{th}$ International Conference on Thermoelectrics, pp. 494-498, 1996.

* cited by examiner

RADIATION DETECTOR AND RADIATION DETECTION METHOD

TECHNICAL FIELD

The present invention relates to a radiation detector that utilizes an anisotropic thermoelectric effect and a radiation detection method using the same.

BACKGROUND ART

When a temperature difference is generated between both ends of a thermoelectric conversion material, an electromotive force (a thermal electromotive force) is generated in proportion to the temperature difference. The phenomenon that thermal energy is converted into electrical energy in a thermoelectric conversion material is known as the Seebeck effect. The electromotive force V that is generated is expressed as V=SΔT, where ΔT is a temperature difference and S is the Seebeck coefficient peculiar to the material.

In a thermoelectric conversion material that exhibits isotropic physical properties, the electromotive force generated by the Seebeck effect is generated only in the direction in which the temperature difference has been generated. On the other hand, due to the inclined arrangement of the crystal axes, the thermoelectric conversion material that exhibits anisotropy in its electrical transport properties generates an electromotive force in the direction orthogonal to the direction in which the temperature difference has been generated. The electrical transport properties denote the behavior of electrons and positive holes having electric charges that move in a substance. As described above, the phenomenon that due to the inclined arrangement of the crystal axes of the material, an electromotive force is generated in the direction that is different from the direction in which the temperature difference has been generated (a heat flow direction) is referred to as an anisotropic thermoelectric effect or an off-diagonal thermoelectric effect.

FIG. 13 is a diagram of a coordinate system for explaining the anisotropic thermoelectric effect. As shown in FIG. 13, the crystal axes abc of the sample 101 are inclined to the spatial axes xyz. In the sample 101, when a temperature difference $\Delta T_z$ is applied in the direction along the z axis, an electromotive force $V_x$ is generated in the direction orthogonal to the z axis, i.e. the direction along the x axis. The electromotive force $V_x$ is represented by Formula (1):

[Mathematical Formula 1]

$$V_x = \frac{l}{2d}\Delta T_z \cdot \Delta S \cdot \sin 2\alpha \quad (1)$$

where l denotes the width of the sample 101, d denotes the thickness of the sample 101, α denotes the inclination angle of the a-b plane to the surface (the x-y plane) of the sample 101, and ΔS denotes the difference (the difference that occurs due to anisotropy) between the Seebeck coefficient $S_c$ in the c-axis direction and the Seebeck coefficient $S_{ab}$ in the a-b in-plane direction.

Conventionally, a radiation detector using an inclined layered thin film of $YBa_2Cu_3O_{7-d}$ (hereinafter referred to as "YBCO") has been proposed as a radiation detector that utilizes the anisotropic thermoelectric effect (see, for example, Patent Literature 1). The inclined layered thin film denotes a thin film that is layered on a substrate and that has a structure in which the crystal axis is inclined to the surface of the substrate and a plurality of layers are layered together. The YBCO thin film has an anisotropic crystal structure in which a $CuO_2$ layer having electrical conductivity and Y and BaO layers that have insulation properties are layered alternately along the c-axis direction. When the YBCO thin film is layered (inclined and layered) on a suitable substrate surface in such a manner that the c axis is inclined to the substrate surface, a similar system to that shown in FIG. 13 is formed. The $CuO_2$ plane corresponds to the a-b plane shown in FIG. 13. When an electromagnetic wave is incident on the surface of the YBCO thin film that has been inclined and layered as described above, a temperature difference is generated in the direction perpendicular to the surface of the YBCO thin film. As a result, an electromotive force is generated in the direction parallel to the surface of the YBCO thin film by the anisotropic thermoelectric effect. Reading this electromotive force allows the electromagnetic wave that has been incident on the surface of the YBCO thin film to be detected. A radiation detector using the YBCO thin film can detect an electromagnetic wave at a sensitivity of approximately 100 mV/K.

From Formula (1), the electromotive force $V_x$ that is generated by the anisotropic thermoelectric effect is proportional to the difference ΔS that occurs due to anisotropy of the Seebeck coefficient, the aspect ratio 1/d of a sample, and a sine value of sin 2α of an angle that is twice the inclination angle α. In the YBCO thin film, the difference ΔS is smaller than 10 μV/K, and the upper limit for maintaining the inclination angle α of the $CuO_2$ plane at a single angle is limited to approximately 10 to 20° (see, for example, Non-Patent Literature 1 and Non-Patent Literature 2). Accordingly, the radiation detector that includes the YBCO thin film used therein cannot be said to have sufficiently high sensitivity for being used practically. In order to improve the sensitivity of a radiation detector that includes an inclined layered thin film used therein, there are methods in which, for example, a material with a larger difference ΔS is used and the inclination angle α of the thin film is brought close to 45 degrees as much as possible. Since the range of the inclination angle α in the inclined layered thin film depends on the combination of the thin film material and the substrate material on which the thin film material is layered, it is preferable that a suitable substrate material be selected so that the inclination angle α can be controlled widely up to around 45°.

Patent Literature 1 discloses a radiation detector in which a YBCO thin film partially doped with Pr is used. According to Patent Literature 1, the radiation detector has a sensitivity approximately twenty times higher than that of a radiation detector with a non-doped YBCO thin film used therein. It is suggested that the reason for this is because the Seebeck coefficient of the YBCO thin film is increased by Pr doping. However, Non-Patent Literature 3 describes that in a Pr-doped YBCO thin film, the Seebeck coefficient increases in the direction of the a-b in-plane but remains unchanged in the c-axis direction. Furthermore, Non-Patent Literature 3 describes that the difference ΔS becomes smaller in the Pr doping range that is employed in the YBCO thin film used for the radiation detector of Patent Literature 1. Therefore, using light with a wavelength (308 nm) that was different from light with a wavelength of 248 nm used in Patent Literature 1, the response of the Pr-doped YBCO thin film to light irradiation was actually measured by the same experimental method as in Non-Patent Literature 3. As a result, it was confirmed that the Pr-doped YBCO thin film had a smaller electromotive force that was generated by the anisotropic thermoelectric effect.

The improvement in sensitivity of the radiation detector with the Pr-doped YBCO thin film used therein is probably attributed to an increase in absorption coefficient of the YBCO thin film with respect to light with a wavelength of 248 nm due to Pr doping. That is, although the radiation detector of Patent Literature 1 is highly sensitive to light with a wavelength of 248 nm, it cannot be said that the detection sensitivity is improved in other wavelength ranges.

PRIOR ART LITERATURE

[Patent Literature]
[Patent Literature 1] JP 8-247851 A
[Non-Patent Literature]
[Non-Patent Literature 1] H. S. Kwok, J. P. Zheng, "Anomalous photovoltaic response in YBa$_2$Cu$_3$O$_7$", The American Physical Society, PHYSICAL REVIEW B, (1992), VOLUME 46, NUMBER 6, 3692
[Non-Patent Literature 2] Physica C 377 (2002) 26-35, Elsevier Science B. V.
[Non-Patent Literature 3] 15th International Conference on Thermoelectrics (1996), IEEE, pp. 494-498

DISCLOSURE OF INVENTION

The present invention is made with the above situation in mind and is intended to provide a radiation detector and radiation detection method with higher detection sensitivity.

The present inventors made various studies and found that the above-mentioned object was achieved by the following present invention. That is, a radiation detector of the present invention includes an Al$_2$O$_3$ substrate, a Fe$_2$O$_3$ thin film layered on the Al$_2$O$_3$ substrate, a Ca$_x$CoO$_2$ (where $0.15<x<0.55$) thin film that is layered on the Fe$_2$O$_3$ thin film and that has CoO$_2$ planes that are aligned inclined to the surface of the Al$_2$O$_3$ substrate, a first electrode disposed on the Ca$_x$CoO$_2$ thin film, and a second electrode disposed on the Ca$_x$CoO$_2$ thin film in a position opposed to the first electrode in the direction in which the CoO$_2$ planes are aligned inclined.

Furthermore, a radiation detection method of the present invention is a radiation detection method of detecting an electromagnetic wave using a radiation detector, wherein the radiation detector includes an Al$_2$O$_3$ substrate, a Fe$_2$O$_3$ thin film layered on the Al$_2$O$_3$ substrate, a Ca$_x$CoO$_2$ (where $0.15<x<0.55$) thin film that is layered on the Fe$_2$O$_3$ thin film and that has CoO$_2$ planes that are aligned inclined to the surface of the Al$_2$O$_3$ substrate, a first electrode disposed on the Ca$_x$CoO$_2$ thin film, and a second electrode disposed on the Ca$_x$CoO$_2$ thin film in a position opposed to the first electrode in the direction in which the CoO$_2$ planes are aligned inclined, a thermal electromotive force is extracted that is generated between the first electrode and the second electrode according to a temperature difference generated in the Ca$_x$CoO$_2$ thin film by an electromagnetic wave that is incident on the Ca$_x$CoO$_2$ thin film, and the electromagnetic wave is detected according to the thermal electromotive force.

The present inventors studied various conditions and optimized them and thereby found that in a laminate having a three-layer structure including a Ca$_x$CoO$_2$ thin film, a Fe$_2$O$_3$ thin film, and an Al$_2$O$_3$ substrate, it was possible to produce a Ca$_x$CoO$_2$ thin film with a crystal axis that was inclined considerably to the surface of the Al$_2$O$_3$ substrate. According to the radiation detector that includes the laminate having a three-layer structure, it is possible to increase the inclination angle of the crystal axis of the Ca$_x$CoO$_2$ thin film, which is an inclined layered thin film. Therefore, it also is possible to make the inclination angle approach 45°, and thereby the detection sensitivity (an electromotive force) of the radiation detector can be increased.

The present invention can provide a radiation detector and radiation detection method with higher detection sensitivity.

DESCRIPTION OF THE PREFERRED EMBODIMENTS

Figure 1:
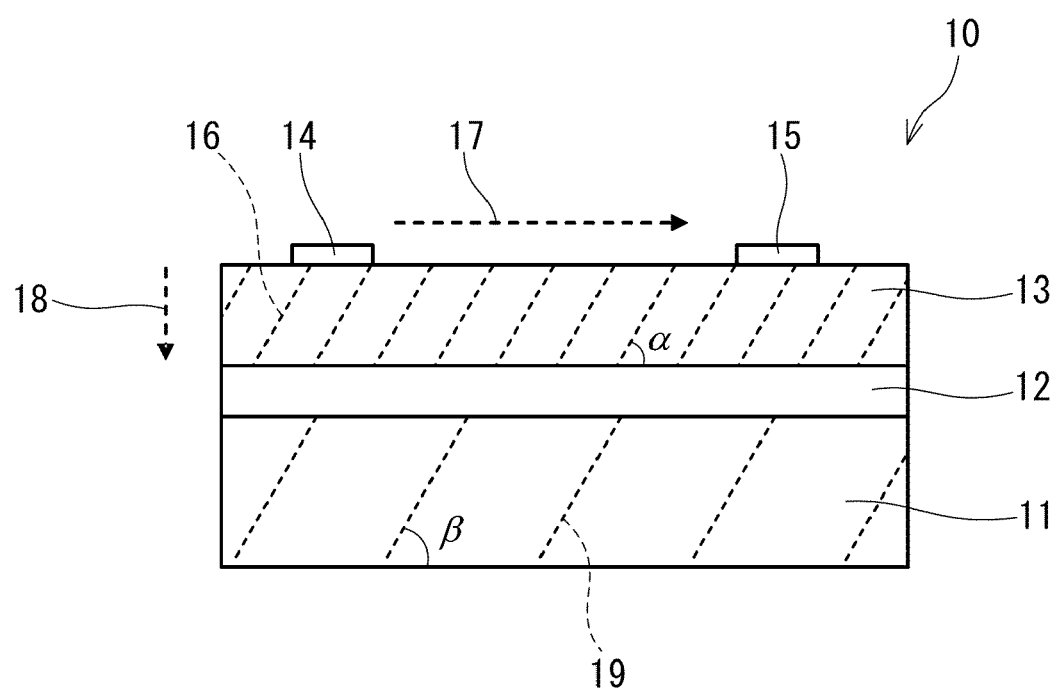
FIG. 1 is a cross-sectional view of an embodiment of the radiation detector according to the present invention.

FIG. 1 is a cross-sectional view of an embodiment of the radiation detector according to the present invention. As shown in FIG. 1, the radiation detector 10 includes an Al$_2$O$_3$ substrate (a sapphire substrate) 11, a Fe$_2$O$_3$ thin film 12 layered on the Al$_2$O$_3$ substrate 11, and a Ca$_x$CoO$_2$ thin film 13 layered on the Fe$_2$O$_3$ thin film 12 as well as a first electrode 14 and a second electrode 15 that are disposed on the Ca$_x$CoO$_2$ thin film 13. In the Ca$_x$CoO$_2$ thin film 13, a deviation in composition may occur depending on the production conditions, but it is acceptable as long as x satisfies $0.15<x<0.55$.

The Ca$_x$CoO$_2$ thin film 13 is an inclined layered thin film and has a layer structure with CoO$_2$ layers and Ca, block layers that are layered alternately. In the Ca$_x$CoO$_2$ thin film 13, the Seebeck coefficient $S_{ab}$ in the in-plane direction of the CoO$_2$ planes 16 is different from the Seebeck coefficient $S_c$ in the c-axis direction of the Ca$_x$CoO$_2$ thin film 13, which is a direction perpendicular to the in-plane direction, and the Ca$_x$CoO$_2$ thin film 13 exhibits anisotropy.

In the Ca$_x$CoO$_2$ thin film 13, a plurality of CoO$_2$ planes 16 are inclined to the surface of the Al$_2$O$_3$ substrate 11 and are arranged in parallel with one another. The second electrode 15 is disposed to be separated from the first electrode 14 in the electromotive-force extracting direction 17. In other words, the electromotive-force extracting direction is a direction in which the first electrode 14 and the second electrode 15 are opposed to each other. The electromotive-force extracting direction 17 is perpendicular to the line formed at an intersection of a CoO$_2$ plane 16 and the surface of the Ca$_x$CoO$_2$ thin film 13 (the line in the direction perpendicular to the plane of the paper) and parallel with the surface of the Ca$_x$-

$CoO_2$ thin film 13 and is a direction in which the $CoO_2$ planes 16 are arranged inclined. The $CoO_2$ planes 16 are inclined at an inclination angle α to the electromotive-force extracting direction 17. Furthermore, the $CoO_2$ planes 16 also are inclined at an inclination angle α to the surface of the $Al_2O_3$ substrate 11.

The radiation detector 10 has a three-layer structure composed of the $Ca_xCoO_2$ thin film 13, the $Fe_2O_3$ thin film 12, and the $Al_2O_3$ substrate 11. In a laminate with the three-layer structure, it is possible to produce an inclined layered thin film ($Ca_xCoO_2$ thin film 13) with a structure in which the crystal axis is inclined considerably to the surface of the $Al_2O_3$ substrate 11. Therefore, the inclination angle α can be larger than that of the inclined layered thin film of a conventional radiation detector. In the radiation detector 10, the inclination angle α can be 10° to 80° and is preferably 25° to 65°. This allows a radiation detector 10 with high detection sensitivity to be obtained. As also is understood from Formula (1), it is particularly preferable that the inclination angle α be 45° in the radiation detector 10. In the radiation detector 10, the inclination angle α is allowed to approach 45° further.

In the radiation detector 10, when an electromagnetic wave is incident on the $Ca_xCoO_2$ thin film 13, the electromagnetic wave is absorbed by the $Ca_xCoO_2$ thin film 13. This generates a temperature gradient in the thin-film interplanar direction 18 in the $Ca_xCoO_2$ thin film 13. The thin-film interplanar direction 18 is perpendicular to the surface of the $Ca_xCoO_2$ thin film 13 and orthogonal to the electromotive-force extracting direction 17. A temperature difference is generated in the $Ca_xCoO_2$ thin film 13 and thereby an electromotive force is generated in the electromotive-force extracting direction 17 in the $Ca_xCoO_2$ thin film 13 by the anisotropic thermoelectric effect. The electromotive force thus generated is output to the outside through the first electrode 14 and the second electrode 15. The electromotive force output through the first electrode 14 and the second electrode 15 is detected and thereby the electromagnetic wave that has been incident on the $Ca_xCoO_2$ thin film 13 can be detected.

The radiation detector 10 of the present invention can be produced by sequentially layering the $Fe_2O_3$ thin film 12 and the $Ca_xCoO_2$ thin film 13 on the $Al_2O_3$ substrate 11 and placing the first electrode 14 and the second electrode 15 on the $Ca_xCoO_2$ thin film 13. The method of layering the $Fe_2O_3$ thin film 12 and the $Ca_xCoO_2$ thin film 13 is not particularly limited. For example, various methods can be used including those using vapor phase growth, such as a sputtering method, a vapor deposition method, a laser ablation method, and a chemical vapor deposition method, or those using growth from a liquid phase. The thickness of the $Fe_2O_3$ thin film 12 and that of the $Ca_xCoO_2$ thin film 13 are not particularly limited as long as both of them are equal to or more than that of a unit cell layer. Specifically, they can be approximately 50 nm to 200 nm. However, there is no problem even if the thicknesses are out of this range.

The inclination angle α of the $CoO_2$ planes 16 in the $Ca_xCoO_2$ thin film 13 is determined by the value of the inclination angle β formed between the surface of the $Al_2O_3$ substrate 11 and a (0001) plane 19 in the $Al_2O_3$ substrate 11. Accordingly, in producing the radiation detector 10, the $Al_2O_3$ substrate 11 having an inclination angle β corresponding to a desired value of the inclination angle α can be prepared. In this case, the inclination angle α is a value of approximately β±15° but the value of the inclination angle α may vary out of this range according to the production conditions.

The first electrode 14 and the second electrode 15 are not particularly limited as long as they are formed of materials with a high electrical conductivity. Specifically, a metal such as Cu, Ag, Mo, Al, Ti, Cr, Au, Pt, or In, a nitride such as TiN, or an oxide such as indium tin oxide (ITO) or $SnO_2$ can be used. Furthermore, a solder or a conductive paste may be used to produce the first and second electrodes 14 and 15. The method of producing the first and second electrodes 14 and 15 on the $Ca_xCoO_2$ thin film 13 is not particularly limited. Various methods such as application of a conductive paste, plating, thermal spraying, and solder joint with a solder can be used in addition to those using vapor phase growth, such as a vapor deposition method and a sputtering method. The constituent material for the first electrode 14 and the second electrode 15 is preferably Cu, Ag, Au, or Al, more preferably Cu, Ag, or Au, and particularly preferably Cu or Ag.

The method of producing the radiation detector 10 is not particularly limited to the above-mentioned methods as long as it is a method that can provide a three-layer structure composed of the $Al_2O_3$ substrate 11, the $Fe_2O_3$ thin film 12, and the $Ca_xCoO_2$ thin film 13 and that can place the first and second electrodes 14 and 15 on the $Ca_xCoO_2$ thin film 13.

With respect to the radiation detector 10, the inclination angle α can be controlled by controlling the inclination angle β of the (0001) planes 19 in the $Al_2O_3$ substrate 11 during the production thereof. Therefore, the inclination angle α can be controlled in a wide range. This makes it possible to obtain an inclination angle of the $CoO_2$ planes that greatly exceeds the inclination angle of the $CuO_2$ planes in a conventional YBCO thin film, in the $Ca_xCoO_2$ thin film 13 having a difference ΔS approximately four times as large as that of the conventional YBCO thin film. Accordingly, it is possible to obtain a radiation detector whose performance greatly exceeds that of a conventional radiation detector with an inclined layered thin film. The present invention promotes application of energy conversion between heat and electricity and therefore has a high industrial value.

Although the $Ca_xCoO_2$ thin film was used as the inclined layered thin film, it is expected that the same effect is obtained even when a $Sr_xCoO_2$ thin film is used instead thereof.

EXAMPLES

Hereinafter, further specific examples of the present invention are described.

Example 1 and Comparative Example

In Example 1, a $Fe_2O_3$ thin film was layered on an $Al_2O_3$-r plane substrate whose surface had a (1-102) plane inclined at approximately 57° to a (0001) plane and further, a $Ca_xCoO_2$ thin film was layered on the $Fe_2O_3$ thin film. Thus, a laminate with a three-layer structure was produced. Hereinafter, the $Ca_xCoO_2$ thin film in the laminate is described as a "$Ca_x$-$CoO_2$/$Fe_2O_3$/$Al_2O_3$-r thin film". In this case, the inclination angle β is 57°. In producing thin films below, radio-frequency magnetron sputtering was used in all cases.

The $Fe_2O_3$ thin film (with a thickness of 100 nm) was produced on the $Al_2O_3$-r plane substrate (with a size of 10 mm×10 mm and a thickness of 0.5 mm) using a $Fe_2O_3$ target. After the inside of a film forming chamber was evacuated to $1.0×10^{-3}$ Pa or lower, the gas pressure inside the chamber was maintained at 1 Pa while an argon gas was introduced, and sputtering was carried out at a RF power of 100 W without heating with a heater.

For production of the $Ca_xCoO_2$ thin film (with a thickness of 150 nm), a target containing Ca and Co that were mixed together in such a manner as to have a molar ratio of 1:1 was used. After the inside of the film forming chamber was evacuated to $1.0×10^{-3}$ Pa or lower, the $Fe_2O_3$/$Al_2O_3$-r laminate was heated with a resistance heater while a mixed gas of argon (96%) and oxygen (4%) was introduced. In order to select optimum conditions for producing the $Ca_xCoO_2$ thin film, the temperature of the $Fe_2O_3/Al_2O_3$-r laminate was varied from 400 to 600° C., with the gas pressure being fixed at 5 Pa, as the film forming conditions. The RF power used during sputtering was fixed at 100 W. After deposition of the thin film, the mixed gas of argon (96%) and oxygen (4%) was introduced. While the gas pressure inside the chamber was maintained at 5 Pa, it was cooled to room temperature over 60 minutes. The cation composition ratio of the $Ca_xCoO_2/Fe_2O_3/Al_2O_3$-r thin film was evaluated with an energy dispersive x-ray spectrometer. As a result, the composition ratio of Ca and Co was approximately 1:2. Accordingly, $x \approx 0.5$.

Furthermore, as a comparative example, a $Ca_xCoO_2$ thin film was layered on an $Al_2O_3$-r plane substrate and thus a laminate with a two-layer structure was produced. Hereinafter, the $Ca_xCoO_2$ thin film in the laminate is described as a "$Ca_xCoO_2/Al_2O_3$-r thin film".

A $Ca_xCoO_2$ thin film (with a thickness of 150 nm) was produced on an $Al_2O_3$-r plane substrate (with a size of 10 mm×10 mm and a thickness of 0.5 mm) using a target containing Ca and Co that had been mixed together in such a manner as to have a molar ratio of 1:1. After the inside of the film forming chamber was evacuated to $1.0 \times 10^{-3}$ Pa or lower, the $Al_2O_3$-r plane substrate was heated with a resistance heater while a mixed gas of argon (96%) and oxygen (4%) was introduced. In order to select optimum conditions for producing the $Ca_xCoO_2$ thin film, the temperature of the $Al_2O_3$-r plane substrate was varied from 400 to 600° C., with the gas pressure being fixed at 5 Pa, as the film forming conditions. The RF power used during sputtering was fixed at 100 W. After deposition of the thin film, the mixed gas of argon (96%) and oxygen (4%) was introduced. While the gas pressure inside the chamber was maintained at 5 Pa, it was cooled to room temperature over 60 minutes. The cation composition ratio of the $Ca_xCoO_2/Al_2O_3$-r thin film was evaluated with the energy dispersive x-ray spectrometer. As a result, the composition ratio of Ca and Co was approximately 1:2. Accordingly, $x \approx 0.5$.

Figure 2:
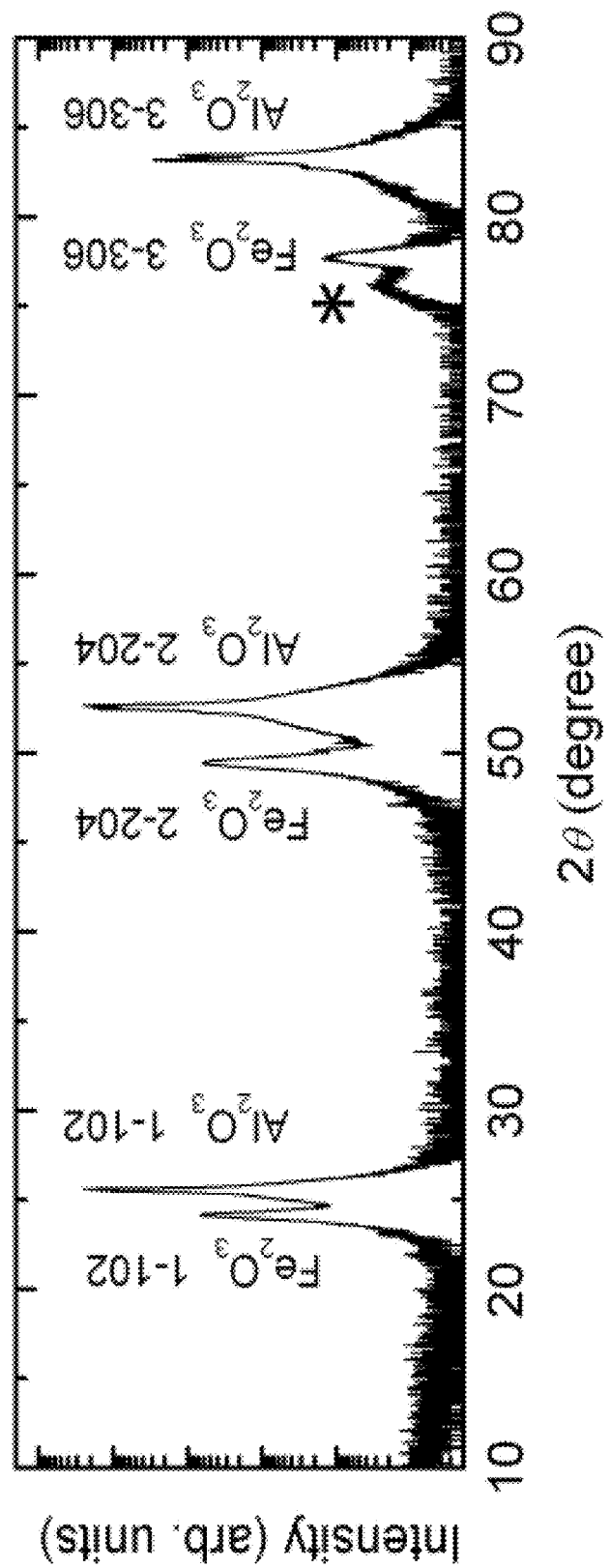
FIG. 2 is a diagram showing a θ-2θ scan XRD pattern of a Ca$_x$CoO$_2$/Fe$_2$O$_3$/Al$_2$O$_3$-r thin film.

FIG. 2 is a diagram showing a θ-2θ scan X-ray diffraction (XRD) pattern of a $Ca_xCoO_2/Fe_2O_3/Al_2O_3$-r thin film. FIG. 2 indicates the measurement result of the $Ca_xCoO_2/Fe_2O_3/Al_2O_3$-r thin film obtained with the temperature being 500° C. in layering the $Ca_xCoO_2$ thin film. As shown in FIG. 2, besides the diffraction peaks derived from the (1-102) planes in the $Al_2O_3$-r plane substrate and the $Fe_2O_3$ thin film, one diffraction peak was observed at $2\theta \approx 75°$. This angle substantially coincides with the angle, at which a (022) diffraction peak of the $Ca_xCoO_2$ thin film appears, which was determined according to the Bragg condition. Therefor, it was suggested that in the $Ca_xCoO_2/Fe_2O_3/Al_2O_3$-r thin film, the $CoO_2$ planes that were the (001) planes were inclined and layered with respect to the surface of the $Al_2O_3$ substrate.

Figure 3:
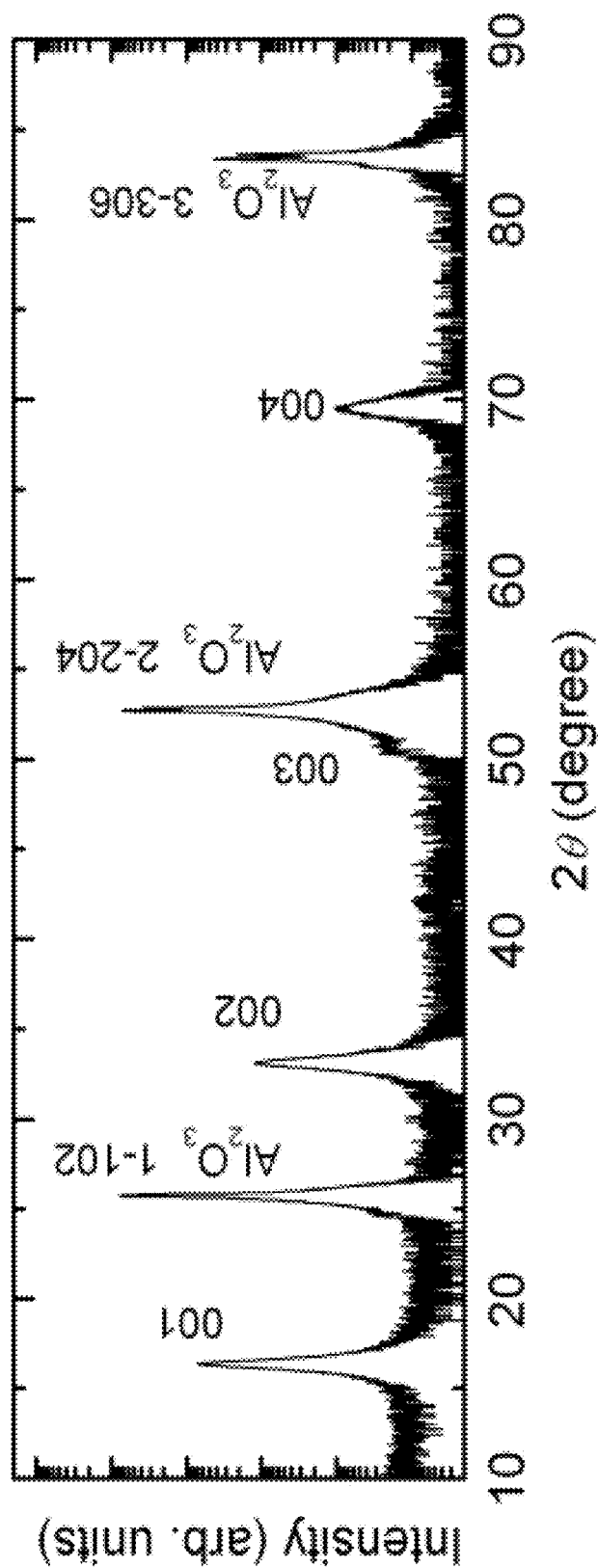
FIG. 3 is a diagram showing a θ-2θ scan XRD pattern of a Ca$_x$CoO$_2$/Al$_2$O$_3$-r thin film.

FIG. 3 shows a θ-2θ scan XRD pattern of a $Ca_xCoO_2/Al_2O_3$-r thin film. FIG. 3 indicates the measurement result of the $Ca_xCoO_2/Al_2O_3$-r thin film obtained with the temperature being 500° C. in layering the $Ca_xCoO_2$ thin film. As shown in FIG. 3, besides the diffraction peak derived from the (1-102) planes in the $Al_2O_3$-r plane substrate, diffraction peaks derived from the (001) planes (l=1, 2, 3, and 4) of the $Ca_xCoO_2/Al_2O_3$-r thin film were observed. In the $Ca_xCoO_2/Al_2O_3$-r thin film, the (001) planes correspond to the $CoO_2$ planes. Accordingly, in the $Ca_xCoO_2/Al_2O_3$-r thin film, it was found that the $CoO_2$ planes were layered in parallel with the surface of the $Al_2O_3$ substrate. In other words, the inclined layered structure was not obtained.

Next, in order to confirm the inclined layered structure of the $CoO_2$ planes in the $Ca_xCoO_2/Fe_2O_3/Al_2O_3$-r thin film that was suggested by the θ-2θ scan XRD, the XRD pole figure measurement was carried out. The pole figure measurement can provide information regarding the inclination of specific crystal planes to a substrate surface or the alignment direction thereof. With respect to the measurement conditions, the X-ray incident and detection angles (θ-2θ) are fixed at angles that satisfy the Bragg conditions, in the arrangement where crystal planes to be measured are in parallel with a horizontal plane. In this state, the substrate plane was inclined (ψ=0 to 90°) from the horizontal direction and further was rotated (φ=0 to 360°) in an in-plane direction. The scattered X-rays to be detected are reinforced by each other only when the target crystal planes are in parallel with the horizontal plane. The inclination angle (the value of ψ) and the alignment direction (the value of φ) of the crystal planes can be obtained through the measurement of intensity distribution of scattered light that is detected, with ψ and φ being varied.

Figure 4:
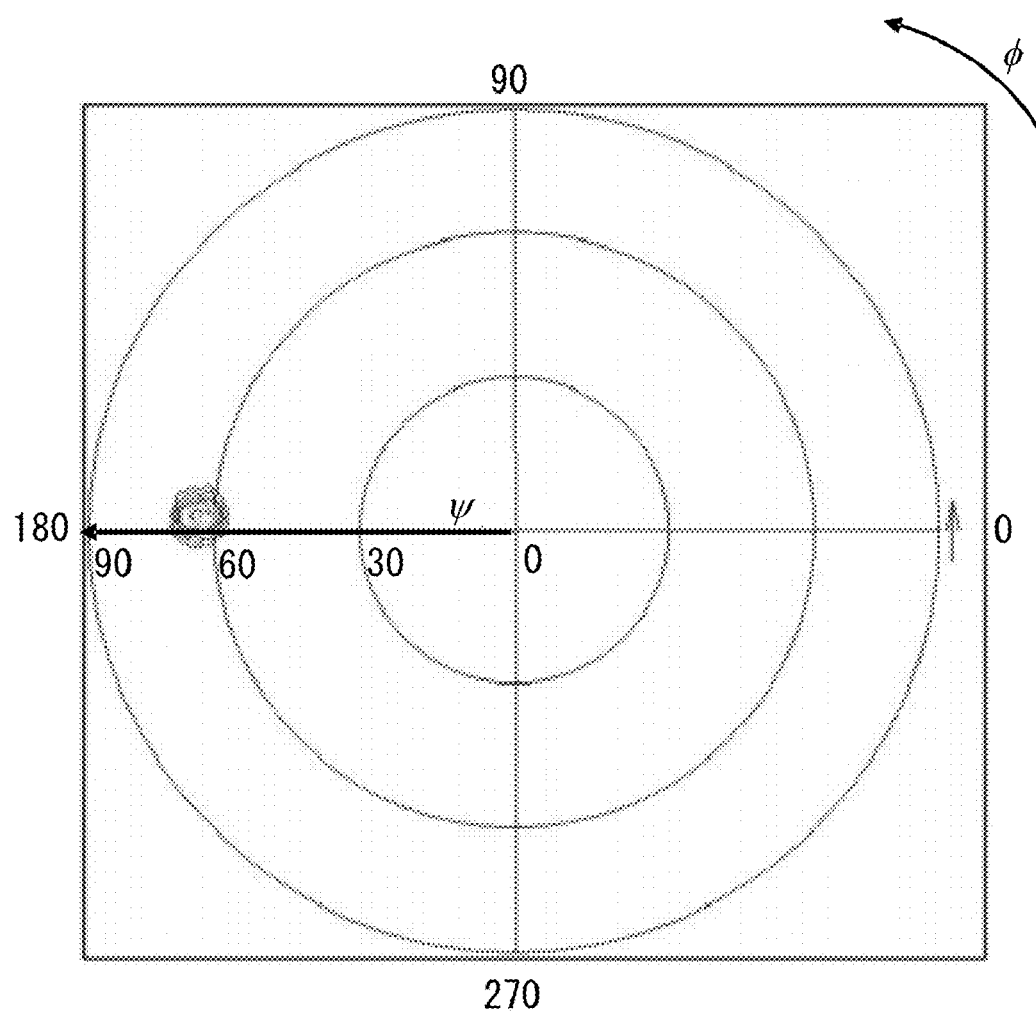
FIG. 4 is a diagram showing a pole figure of the Ca$_x$CoO$_2$/Fe$_2$O$_3$/Al$_2$O$_3$-r thin film.

The XRD pole figure measurement was carried out with respect to the $Ca_xCoO_2/Fe_2O_3/Al_2O_3$-r thin film, with 2θ being fixed at an angle at which a (001) diffraction peak of the $Ca_xCoO_2/Fe_2O_3/Al_2O_3$-r thin film appears. FIG. 4 shows the result. FIG. 4 shows that one diffraction peak having the maximum value at ψ≈60° and φ≈180° has appeared. This indicates that the (001) planes in the $Ca_xCoO_2/Fe_2O_3/Al_2O_3$-r thin film are inclined at approximately 60° to the surface of the $Al_2O_3$ substrate. Therefore, the inclination angle α is approximately 60°. This angle substantially coincides with the angle that is formed between a (011) plane and a (001) plane in the $Ca_xCoO_2/Fe_2O_3/Al_2O_3$-r thin film. Furthermore, only one (001) diffraction peak observed in this pole figure indicated that the $CoO_2$ planes were inclined and layered in a single direction in the $Ca_xCoO_2/Fe_2O_3/Al_2O_3$-r thin film.

Figure 5:
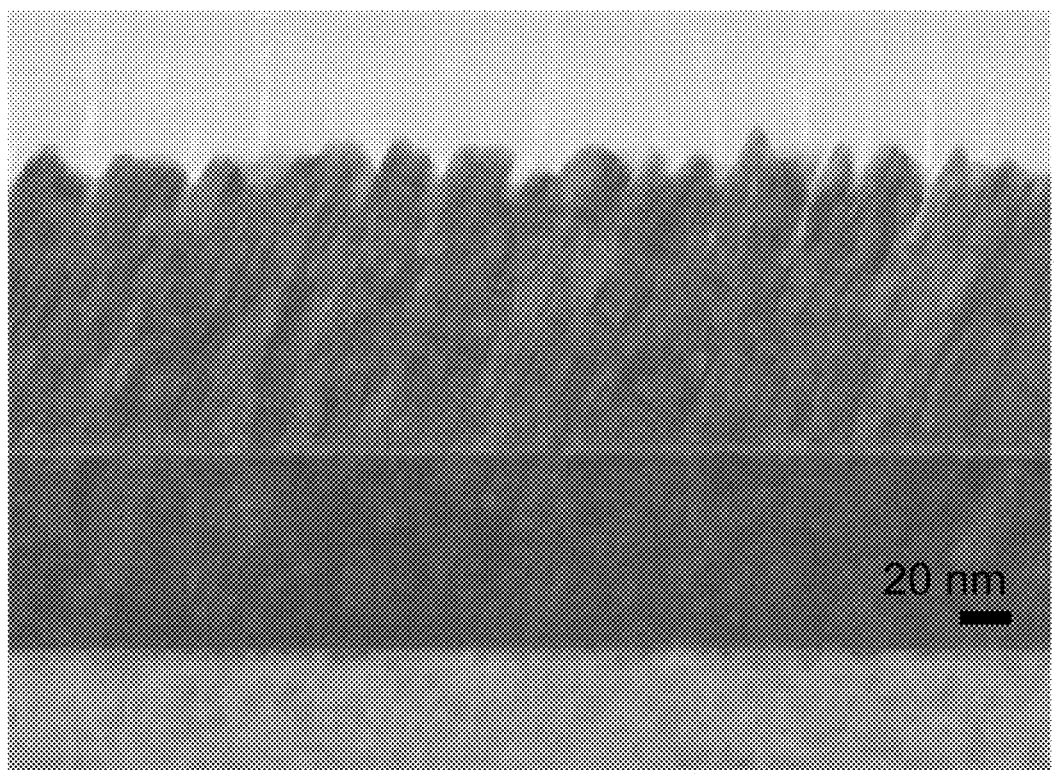
FIG. 5 is a cross-sectional image of the three layers of a Ca$_x$CoO$_2$/Fe$_2$O$_3$/Al$_2$O$_3$-r laminate.
Figure 6:
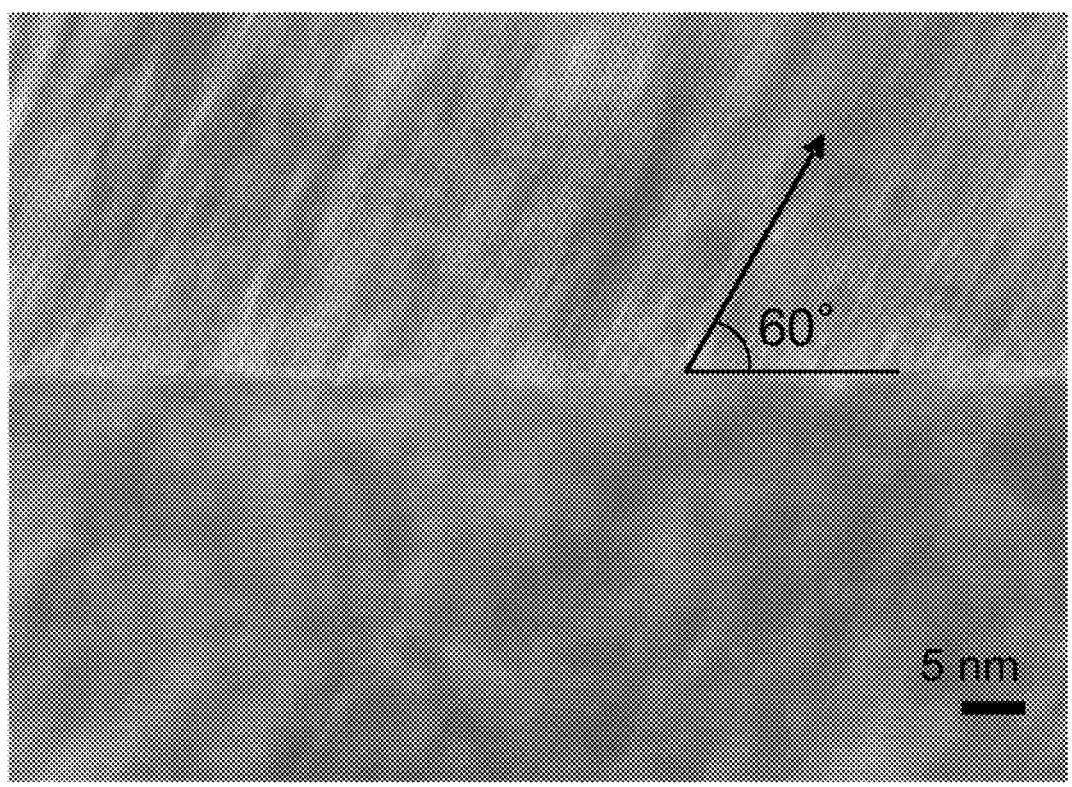
FIG. 6 is a cross-sectional image of a vicinity of the Ca$_x$CoO$_2$/Fe$_2$O$_3$ interface.
Figure 7:
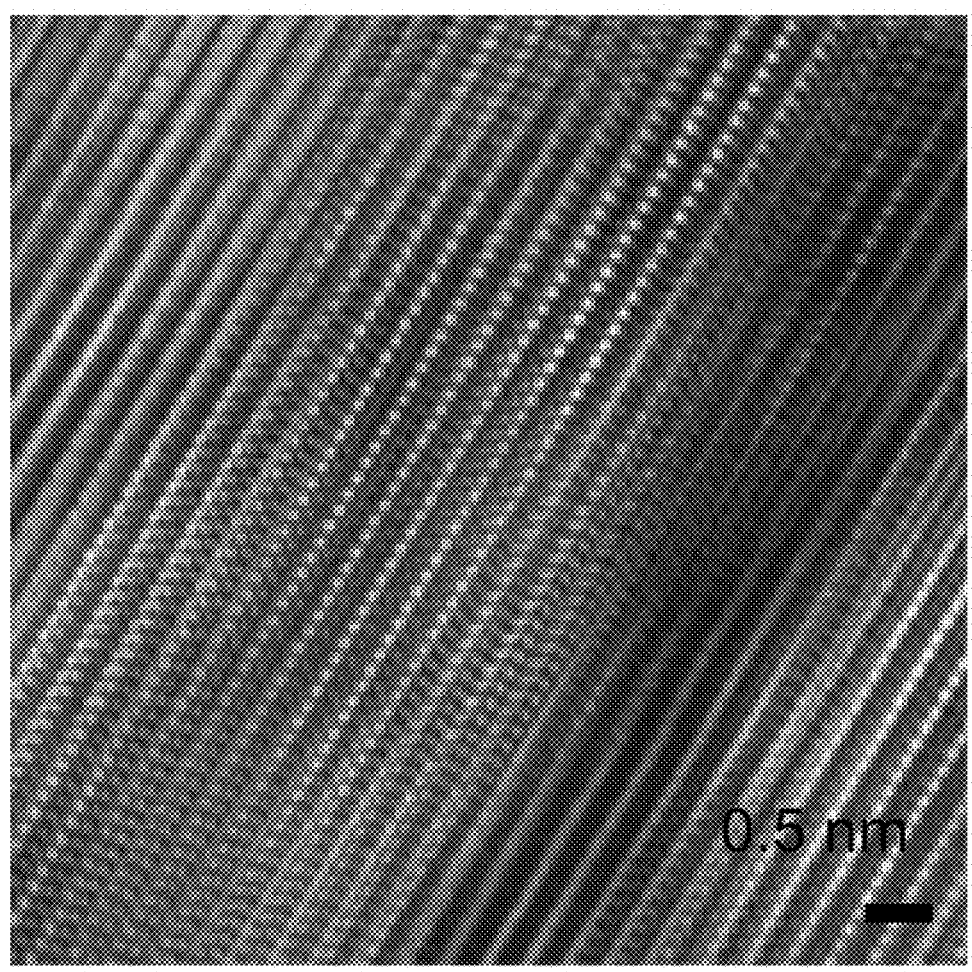
FIG. 7 is a high-resolution image of the inside of the Ca$_x$CoO$_2$ thin film.

In order further to check the inclined layered structure of the $CoO_2$ planes in the $Ca_xCoO_2/Fe_2O_3/Al_2O_3$-r thin film, it was evaluated with a cross-sectional transmission electron microscope. FIG. 5 is a cross-sectional image of the three layers of a $Ca_xCoO_2/Fe_2O_3/Al_2O_3$-r laminate. FIG. 6 is a cross-sectional image of a vicinity of the $Ca_xCoO_2/Fe_2O_3$ interface. FIG. 7 is a high-resolution image of the inside of the $Ca_xCoO_2$ thin film. As shown in FIGS. 5 to 7, a uniform stripe structure with an inclination of approximately 60° was observed clearly inside the $Ca_xCoO_2/Fe_2O_3/Al_2O_3$-r thin film. A uniform inclined layered structure of the $CoO_2$ layer has been formed actually in the $Ca_xCoO_2/Fe_2O_3/Al_2O_3$-r thin film, and the inclination angle α is approximately 60°. This coincides with the result obtained through the pole figure measurement. It can be understood from the above description that the $Fe_2O_3$ thin film is layered as a buffer layer on the $Al_2O_3$ substrate and the $Ca_xCoO_2$ thin film is layered thereon, so that a $Ca_xCoO_2$ thin film with the $CoO_2$ planes being inclined and layered with respect to the surface of the $Al_2O_3$ substrate can be produced.

Figure 8:
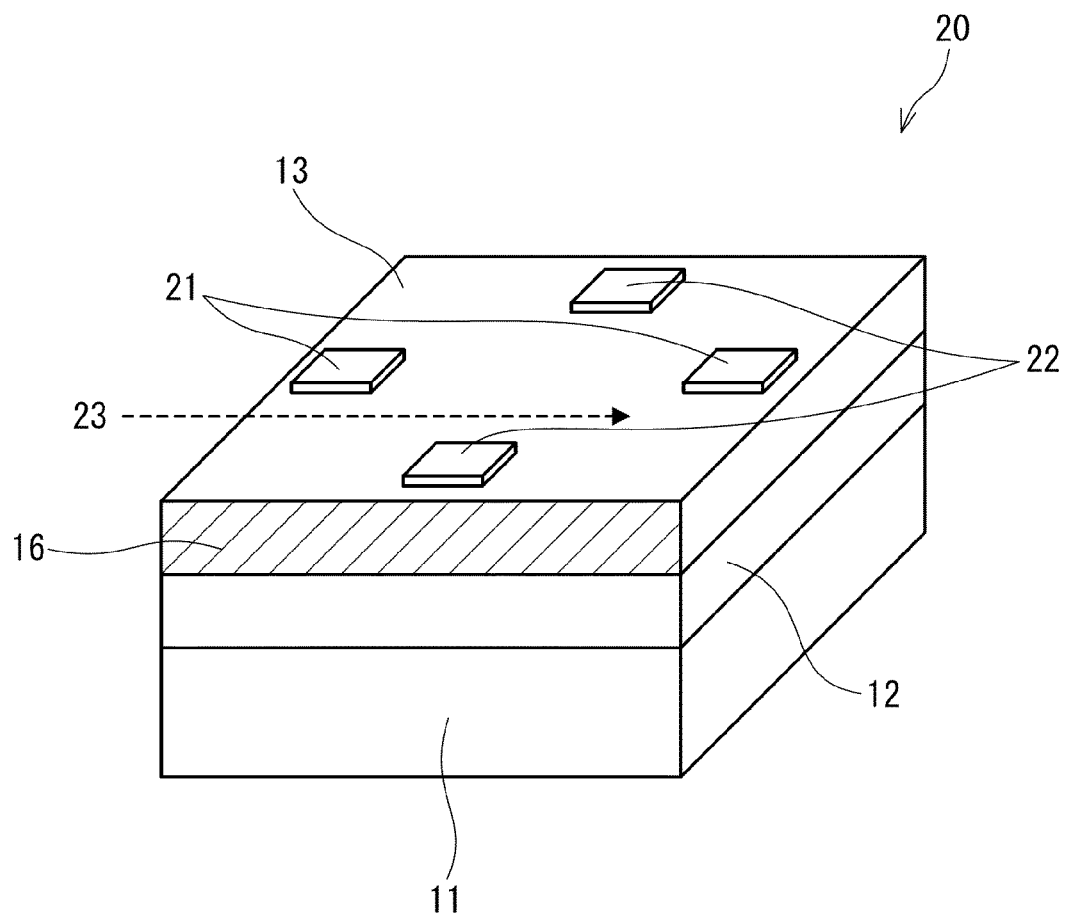
FIG. 8 is a perspective view showing the configuration of a radiation detector for measuring an electromotive force.

FIG. 8 is a perspective view showing the configuration of a radiation detector for measuring an electromotive force. As shown in FIG. 8, the radiation detector 20 includes an $Al_2O_3$ substrate 11, a $Fe_2O_3$ thin film 12, and a $Ca_xCoO_2$ thin film 13 that are layered sequentially as well as a first electrode pair 21 and a second electrode pair 22 that are placed on the $Ca_xCoO_2$ thin film 13. The first electrode pair 21 is a pair of electrodes disposed to be separated from each other along the inclined alignment direction 23 of $CoO_2$ planes 16. The second electrode pair 22 is a pair of electrodes disposed to be separated from each other along the direction perpendicular to the inclined alignment direction 23. The inclined alignment direction 23 is identical to the electromotive-force extracting direction. The first electrode pair 21 and the second electrode pair 22 were disposed in such a manner that the intersection between the line segment extending between the respective electrodes of the first electrode pair 21 and the line segment extending between the respective electrodes of the second electrode pair 22 is the center position of each line segment. The second electrode pair 22 is used for checking whether an electromotive force is generated in the direction perpendicular to the inclined alignment direction 23. Therefore, it does not need to be disposed in an actual radiation detector.

A radiation detector with the configuration shown in FIG. 8 was produced using a $Ca_xCoO_2/Fe_2O_3/Al_2O_3$-r thin film. In a $Ca_xCoO_2/Fe_2O_3/Al_2O_3$-r laminate, two pairs of electrodes composed of Au to serve as the first electrode pair and the second electrode pair were formed on the surface of the $Ca_xCoO_2$ thin film by the vacuum vapor deposition method. In each electrode pair, the width between the respective electrodes was set at 6 mm. In an actual radiation detector, the width between the electrodes is not limited to 6 mm and can be optimized suitably according to the intended use and the installation location.

Figure 9:
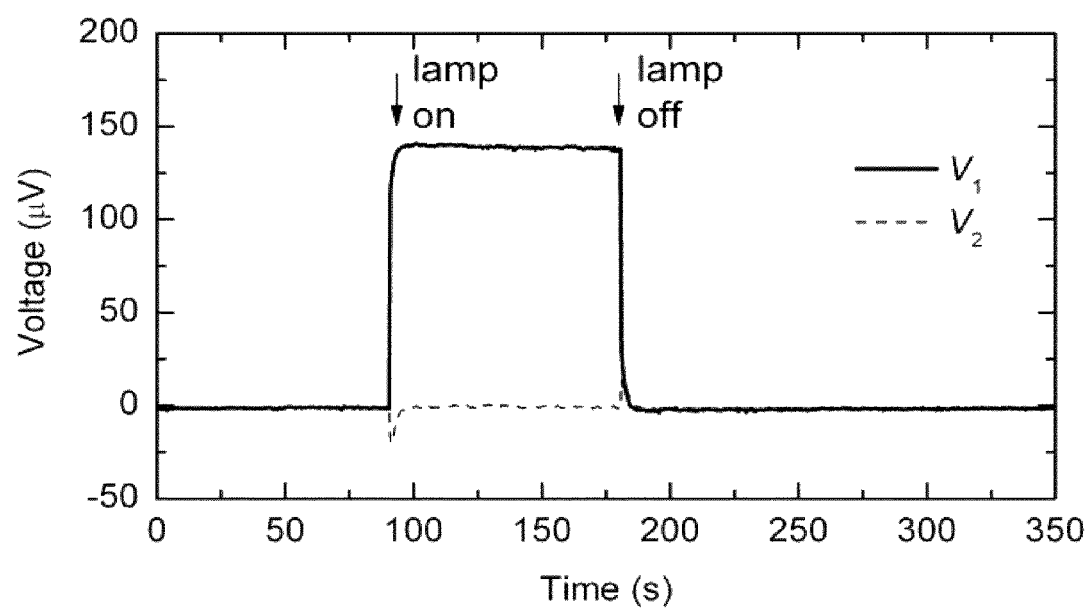
FIG. 9 is a graph showing change of electromotive force with time according to incidence and cutoff of an electromagnetic wave.

An electromagnetic wave generated from an infrared lamp (with a wavelength of 800 to 2000 nm) was allowed to be incident on the surface of the radiation detector that had been produced, in such a manner that the spot diameter was 8 mm. Specifically, an electromagnetic wave at 480 mW was output from the infrared lamp and was allowed to be incident on the center of the $Ca_xCoO_2$ thin film surface, and then the electromotive force $V_1$ generated in the inclined alignment direction and the electromotive force $V_2$ generated in the direction perpendicular to the inclined alignment direction were measured. FIG. 9 shows the measurement result. FIG. 9 is a graph showing change of electromotive force with time according to incidence and cutoff of an electromagnetic wave. When the electromagnetic wave output from the infrared lamp was not incident on the radiation detector, the electromotive forces $V_1$ and $V_2$ were not generated. When the infrared lamp was turned on and an electromagnetic wave was allowed to be incident thereon, the electromotive force $V_1$ increased rapidly and a value of approximately 140 µV was indicated steadily. On the other hand, the electromotive force $V_2$ did not show a notable change. Thereafter, when the infrared lamp was turned off and thereby the electromagnetic wave was cutoff, the electromotive force $V_1$ decreased rapidly to return to zero. On the other hand, the electromotive force $V_2$ did not show a notable change. Accordingly, the direction in which an electromotive force is generated in the radiation detector is the inclined alignment direction alone. Since the direction in which an electromotive force is generated depends on the inclined alignment direction of the $CoO_2$ planes, it can be understood that generation of the electromotive force $V_1$ results from the anisotropic thermoelectric effect.

The temperature difference $\Delta T_z$ that is generated between the upper and lower surfaces of the $Ca_xCoO_2$ thin film layer of the radiation detector is estimated to be approximately 0.2 mK from Formula (1). The respective values in Formula (1) are as follows: $\Delta S=35$ µV/K, d=150 nm, l=6 mm, α=60°, and $V_x=140$ µV. Therefore, the detection sensitivity in the inclined alignment direction reaches 600 mV/K. This is approximately six times as high as the detection sensitivity (100 mV/K) of a radiation detector that includes a conventional YBCO inclined layered thin film used therein.

Example 2

In Example 2, a $Fe_2O_3$ thin film and a $Ca_xCoO_2$ thin film were layered sequentially on an $Al_2O_3$-n plane substrate whose surface had a (11-23) plane inclined at approximately 61° to a (0001) plane and thereby a laminate with a three-layer structure was produced in the same manner as in Example 1. Hereinafter, the $Ca_xCoO_2$ thin film in the laminate is described as a "$Ca_xCoO_2/Fe_2O_3/Al_2O_3$-n thin film". In this case, the inclination angle δ of the $Al_2O_3$-n plane substrate is 61°.

Furthermore, in Example 2, a $Fe_2O_3$ thin film and a $Ca_xCoO_2$ thin film were layered sequentially on an $Al_2O_3$-S plane substrate whose surface had a (10-11) plane inclined at approximately 72° to a (0001) plane and thereby a laminate with a three-layer structure also was produced in the same manner as in Example 1. Hereinafter, the $Ca_xCoO_2$ thin film in the laminate is described as a "$Ca_xCoO_2/Fe_2O_3/Al_2O_3$-S thin film". In this case, the inclination angle β of the $Al_2O_3$-S plane substrate is 72°.

Figure 10:
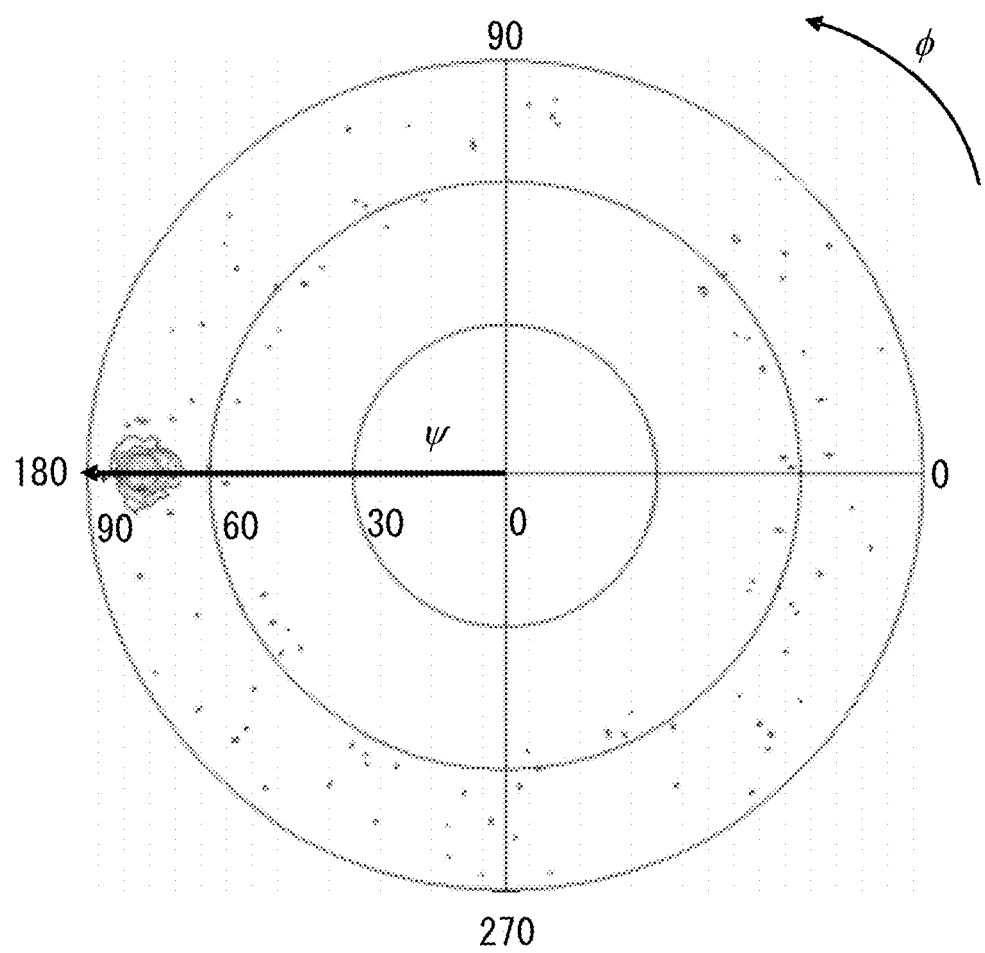
FIG. 10 is a diagram showing the pole figure of a Ca$_x$CoO$_2$/Fe$_2$O$_3$/Al$_2$O$_3$-n thin film.
Figure 11:
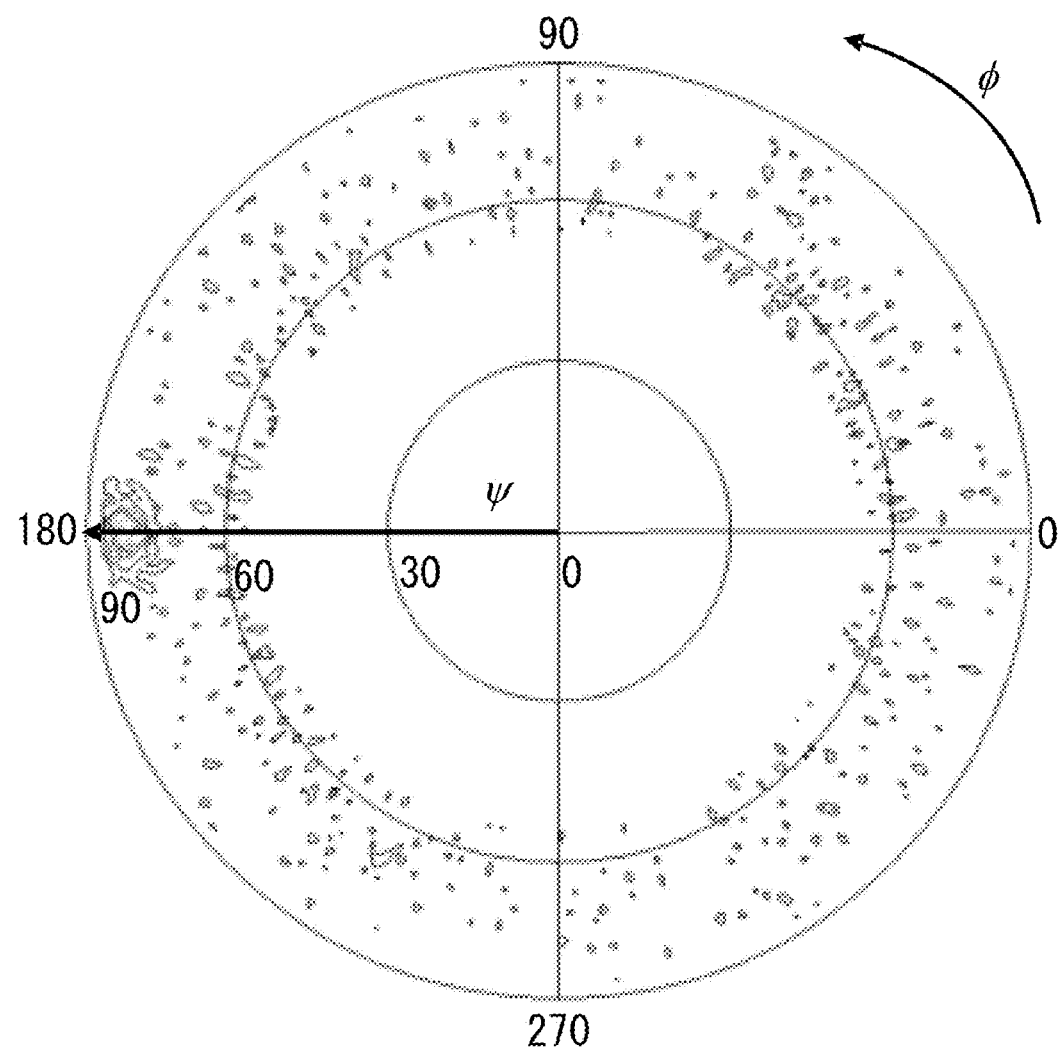
FIG. 11 is a diagram showing the pole figure of a Ca$_x$CoO$_2$/Fe$_2$O$_3$/Al$_2$O$_3$-S thin film.

With respect to the $Ca_xCoO_2/Fe_2O_3/Al_2O_3$-n thin film and the $Ca_xCoO_2/Fe_2O_3/Al_2O_3$-S thin film, the XRD pole figure measurement was carried out. The results are shown in FIGS. 10 and 11. FIG. 10 shows that in the $Ca_xCoO_2/Fe_2O_3/Al_2O_3$-n thin film, the $CoO_2$ planes are inclined at approximately 75° to the surface of the $Al_2O_3$ substrate. Therefore, the inclination angle α of the $Ca_xCoO_2/Fe_2O_3/Al_2O_3$-n thin film is approximately 75°. Furthermore, FIG. 11 shows that in the $Ca_xCoO_2/Fe_2O_3/Al_2O_3$-S thin film, the $CoO_2$ planes are inclined at approximately 80° to the surface of the $Al_2O_3$ substrate. Therefore, the inclination angle α of the $Ca_xCoO_2/Fe_2O_3/Al_2O_3$-S thin film is approximately 80°. Thus, it was confirmed that it was possible to control the inclination angle α of the $CoO_2$ planes in the $Ca_xCoO_2$ thin film in the $Ca_xCoO_2/Fe_2O_3/Al_2O_3$ laminate by controlling the inclination angle β at which the (0001) planes in the $Al_2O_3$ substrate were inclined to the surface of the $Al_2O_3$ substrate.

In the same manner as in Example 1, two Au electrode pairs were produced on each of the $Ca_xCoO_2/Fe_2O_3/Al_2O_3$-n thin film and the $Ca_xCoO_2/Fe_2O_3/Al_2O_3$-S thin film and thereby the radiation detectors with the configuration shown in FIG. 8 were produced. Similarly with respect to these radiation detectors, an electromagnetic wave was allowed to be incident from an infrared lamp and the electromotive force $V_1$ in the inclined alignment direction and the electromotive force $V_2$ in the direction perpendicular to the inclined alignment direction were measured in the same manner as in Example 1.

In the radiation detectors including the $Ca_xCoO_2/Fe_2O_3/Al_2O_3$-n thin film and the $Ca_xCoO_2/Fe_2O_3/Al_2O_3$-S thin film of Example 2 that were used therein, respectively, the electromotive forces $V_1$ and $V_2$ were not generated when no electromagnetic wave was incident thereon as in the case of the radiation detector of Example 1. When the infrared lamp was turned on and an electromagnetic wave was allowed to be incident thereon, the electromotive force $V_1$ increased rapidly and a value of approximately 80 µV was indicated steadily in both the radiation detectors. On the other hand, the electromotive force $V_2$ did not show a notable change in both the radiation detectors. Thereafter, when the infrared lamp was turned off and thereby the electromagnetic wave was cutoff, the electromotive force $V_1$ decreased rapidly to return to zero in both the radiation detectors. On the other hand, the electromotive force $V_2$ did not show a notable change in both the radiation detectors.

Figure 12:
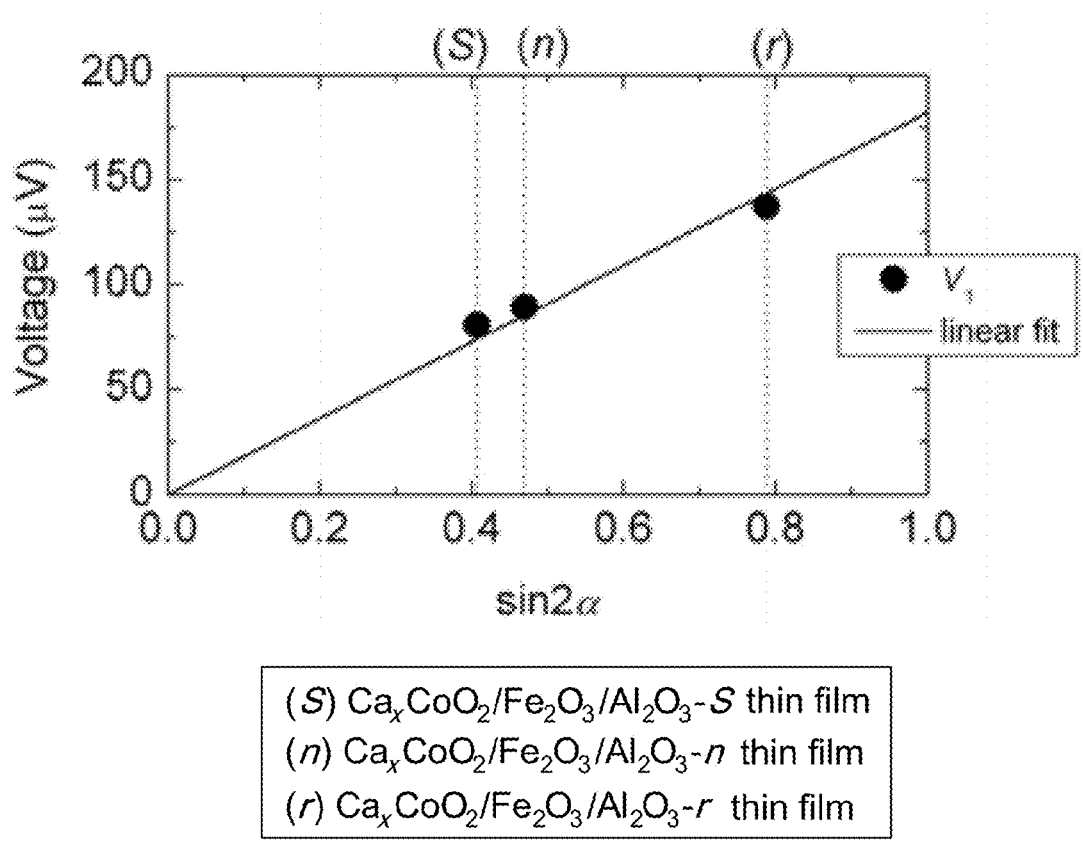
FIG. 12 is a graph showing the relationship between $\sin 2\alpha$ and the voltage obtained in the inclined alignment direction in radiation detectors.
Figure 13:
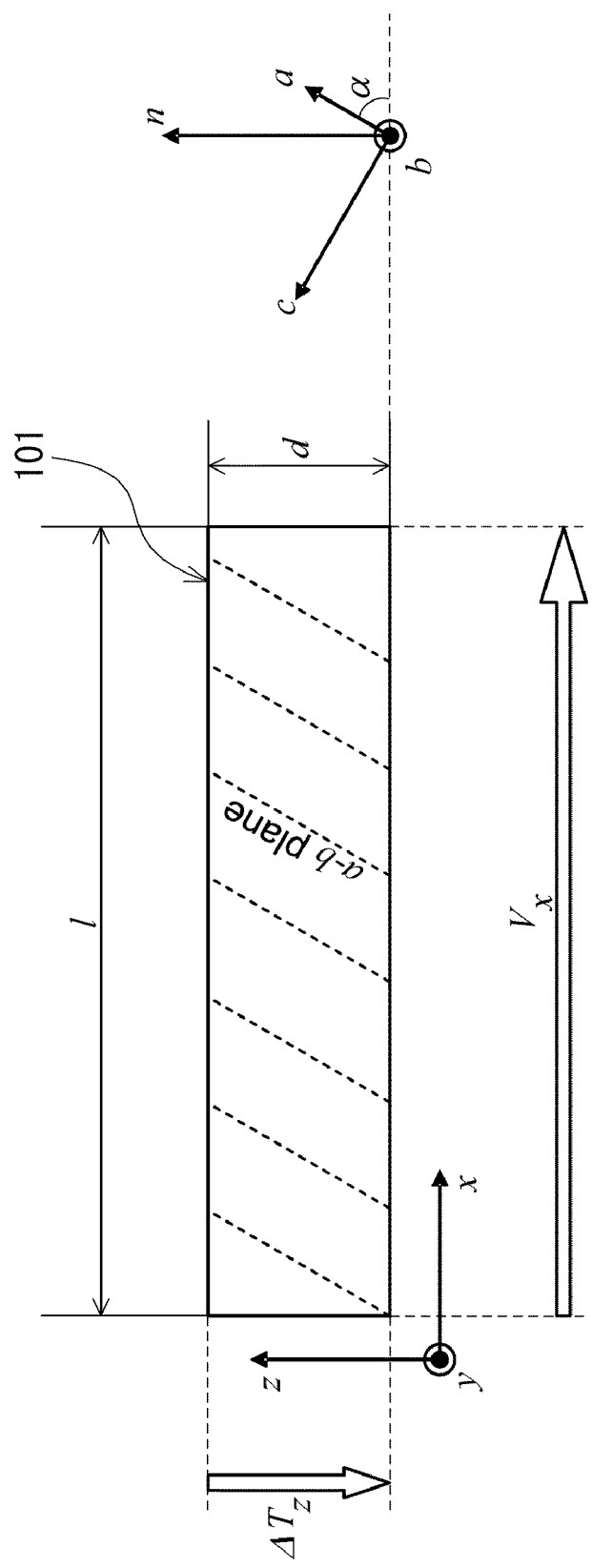
FIG. 13 is a diagram of a coordinate system for explaining the anisotropic thermoelectric effect.

FIG. 12 is a graph showing the relationship between sin 2α and the voltage obtained in the inclined alignment direction in the radiation detectors. In the graph, the vertical axis indicates the electromotive force obtained in the inclined alignment direction in each radiation detector and the horizontal axis indicates sin 2α. FIG. 12 shows the results of measurements carried out by the radiation detectors including the $Ca_xCoO_2/$ $Fe_2O_3/Al_2O_3$-r thin film, the $Ca_xCoO_2/Fe_2O_3/Al_2O_3$-n thin film, and the $Ca_xCoO_2/Fe_2O_3/Al_2O_3$-S thin film that were used therein, respectively. FIG. 12 shows that the electromotive force is changed to a substantially linear shape with respect to sin 2α as indicated in Formula (1). Furthermore, it also was confirmed from FIG. 12 that the sensitivity of each radiation detector was improved as the inclination angle α approaches 45° as indicated in Formula (1).

INDUSTRIAL APPLICABILITY

The radiation detectors according to the present invention each have excellent radiation detection properties and can be used for detecting various objects involving irradiation of an electromagnetic wave in, for example, a temperature sensor and a laser beam power meter.

The invention claimed is:

1. A radiation detector, comprising:
   an $Al_2O_3$ substrate;
   a $Fe_2O_3$ thin film layered on the $Al_2O_3$ substrate;
   a $Ca_xCoO_2$ (where 0.15<x<0.55) thin film that is layered on the $Fe_2O_3$ thin film and that has $CoO_2$ planes that are aligned inclined to the surface of the $Al_2O_3$ substrate, the surface of the $Al_2O_3$ a substrate being an r plane, an n plane, or an S plane;
   a first electrode disposed on the $Ca_xCoO_2$ thin film; and
   a second electrode disposed on the $Ca_xCoO_2$ thin film in a position opposed to the first electrode in the direction in which the $CoO_2$ planes are aligned inclined.

2. The radiation detector according to claim 1, wherein a thermal electromotive force is extracted that is generated between the first electrode and the second electrode according to a temperature difference generated in the $Ca_xCoO_2$ thin film by an electromagnetic wave that is incident on the $Ca_xCoO_2$ thin film, and the electromagnetic wave is detected according to the thermal electromotive force.

3. The radiation detector according to claim 1, wherein the $CoO_2$ planes are inclined at an inclination angle α to the direction in which the first electrode and the second electrode are opposed to each other, and
   the inclination angle α is 10° to 80°.

4. The radiation detector according to claim 1, wherein the first electrode and the second electrode are composed of Cu, Ag, Au, or Al.

5. A radiation detection method, comprising:
   detecting an electromagnetic wave using a radiation detector wherein the radiation detector comprises an $Al_2O_3$ substrate, a $Fe_2O_3$ thin film layered on the $Al_2O_3$ substrate, a $Ca_xCoO_2$ (where 0.15<x<0.55) thin film that is layered on the $Fe_2O_3$ thin film and that has $CoO_2$ planes that are aligned inclined to the surface of the $Al_2O_3$ substrate, a first electrode disposed on the $Ca_xCoO_2$ thin film, and a second electrode disposed on the $Ca_xCoO_2$ thin film in a position opposed to the first electrode in the direction in which the $CoO_2$ planes are aligned inclined, the surface of the $Al_2O_1$ substrate being an r plane, an n plane, or an S plane; and
   extracting a thermal electromotive force generated between the first electrode and the second electrode according to a temperature difference generated in the $Ca_xCoO_2$ thin film by an electromagnetic wave that is incident on the $Ca_xCoO_2$ thin film to detect the electromagnetic wave according to the thermal electromotive force.

6. The radiation detection method according to claim 5, wherein the $CoO_2$ planes are inclined at an inclination angle α to the direction in which the first electrode and the second electrode are opposed to each other, and
   the inclination angle α is 10° to 80°.

* * * * *

UNITED STATES PATENT AND TRADEMARK OFFICE
CERTIFICATE OF CORRECTION

PATENT NO.      : 8,026,486 B2
APPLICATION NO. : 12/865347
DATED           : September 27, 2011
INVENTOR(S)     : Takahashi et al.

It is certified that error appears in the above-identified patent and that said Letters Patent is hereby corrected as shown below:

Column 11, line 24 (claim 1): "a substrate" should read -- substrate --.
Column 12, lines 10-11 (claim 5): "detector wherein" should read -- detector, wherein --.
Column 12, line 20 (claim 5): "$Al_2O_1$" should read -- $Al_2O_3$ --.

Signed and Sealed this
Twenty-fourth Day of April, 2012

David J. Kappos
*Director of the United States Patent and Trademark Office*